Nov. 28, 1933.  A. F. MASURY  1,936,848
BEVERAGE DISPENSING DEVICE
Filed Feb. 23, 1933    2 Sheets-Sheet 2
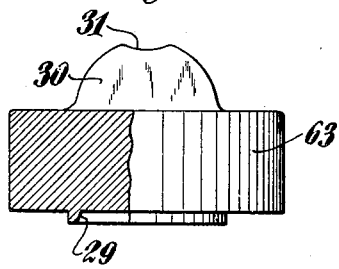
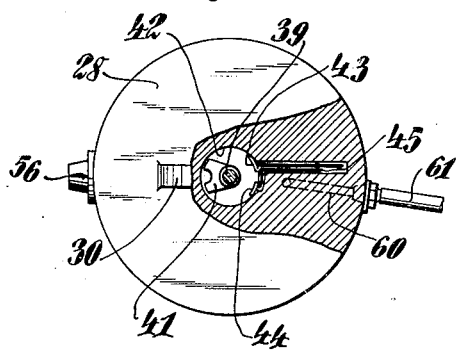
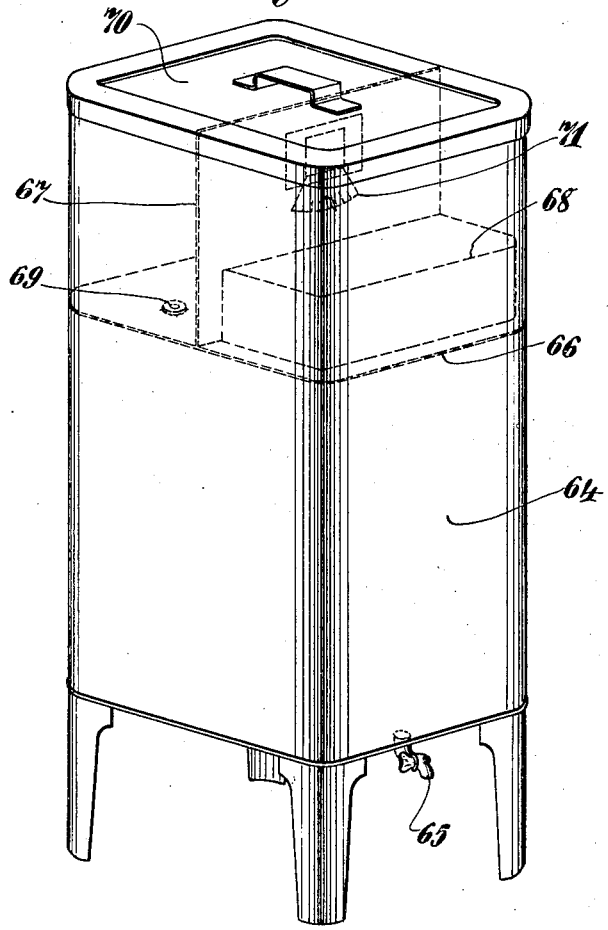
INVENTOR
Alfred F. Masury,
BY
HIS ATTORNEYS Patented Nov. 28, 1933

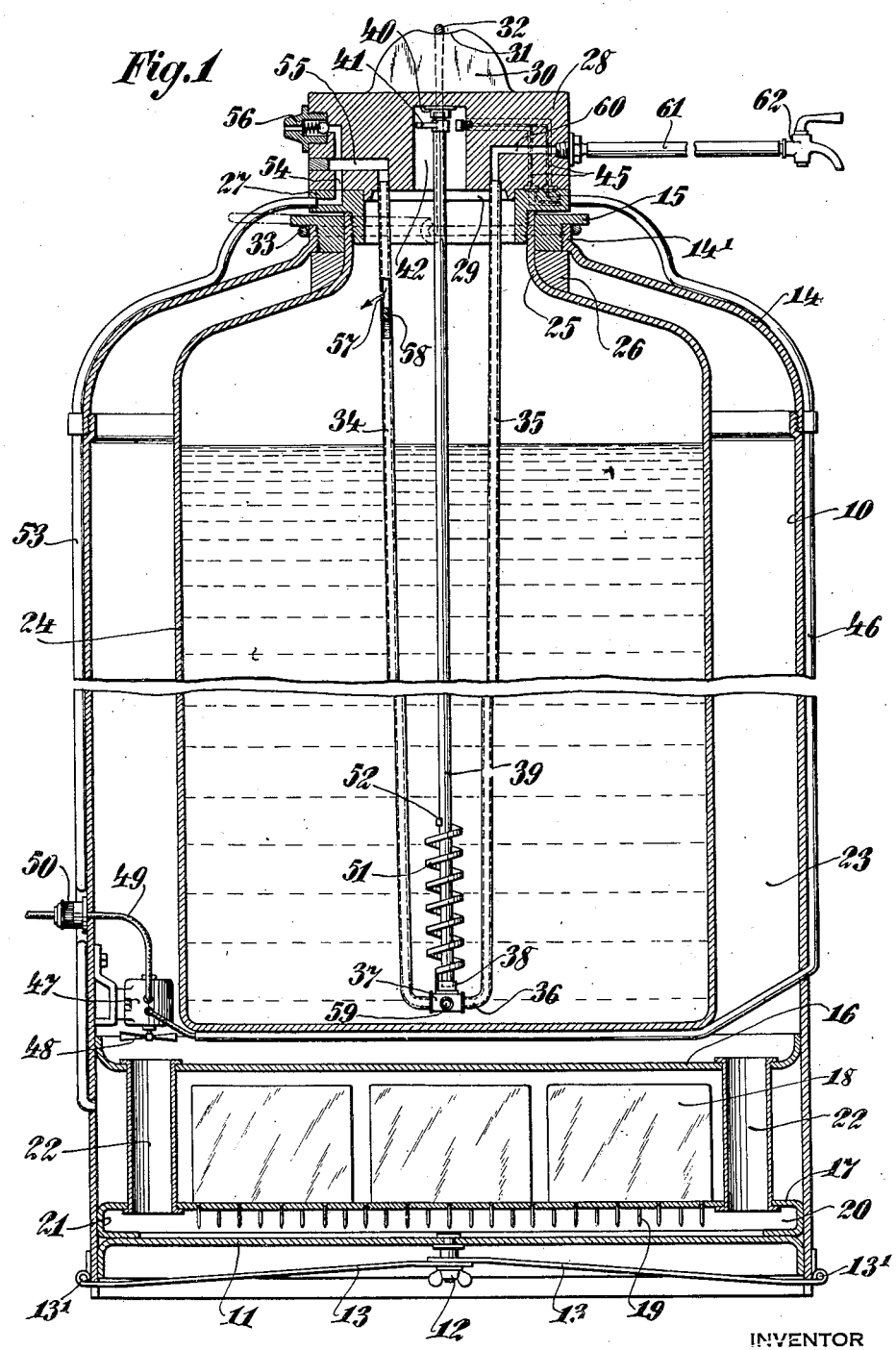

1,936,848

UNITED STATES PATENT OFFICE 1,936,848

BEVERAGE DISPENSING DEVICE

Alfred F. Masury, New York, N. Y., assignor to International Motor Company, New York, N. Y., a corporation of Delaware Application February 23, 1933. Serial No. 658,108

9 Claims. (Cl. 62—91.5)

The present invention relates to devices for dispensing beverages and embodies, more specifically, an improved beverage dispensing apparatus by means of which a beverage, such as beer, may be conveniently maintained in a suitable container and discharged therefrom as desired in such fashion that the best qualities of the beverage are availed of.

Beer should be maintained at a temperature of approximately 38° F. In order that it may be so preserved and dispensed under a predetermined pressure and suitably carbonated, the present invention has been designed and an object thereof is to provide a container which, as a unit, serves as a means for dispensing beer or other beverage on draught.

A further object of the invention is to provide a container which, as a unit, contains means for preserving a beverage under predetermined conditions, and further means for facilitating the dispensing thereof.

A further object of the invention is to provide a beverage container wherein means is incorporated for receiving the beverage and further means provided for maintaining the same under predetermined temperature and pressure conditions.

A further object of the invention is to provide a container of the above character wherein the temperature and pressure regulating means further serves as a means for carbonating the beverage effectively.

A further object of the invention is to provide a beverage container including a temperature regulating means in combination with a thermal medium to enable the temperature of the beverage to be maintained at a predetermined value.

Further objects, not specifically enumerated above, will be apparent as the invention is described in greater detail in connection with the accompanying drawings, wherein:

Figure 1 is a view in section, taken through the axis of a device constructed in accordance with the present invention, and showing the interior thereof.

Figure 2 is a top view of a plug construction formed in accordance with the present invention, the view being broken away and partly in section to illustrate the temperature controlling mechanism thereof.

Figure 3 is a view in side elevation showing a continuous plug constructed in accordance with the present invention.

Figure 4 is a view in isometric projection showing a modified and simplified form of container.

Referring to the above drawings, the container construction includes an outer housing 10 which may be suitably finished and shaped to provide an attractive appearance, the housing being provided with a removable bottom 11 which may be secured in position by a bolt and thumb screw structure 12 in cooperation with arms 13 which may be hinged at 13' to the lower sides of the housing. The housing is provided with a top portion 14 which is formed with a neck 14' within which a collar 15 is mounted.

A removable compartment forming structure is adapted to be inserted within the lower portion of the container, the structure comprising top and bottom plates 16 and 17, respectively, within which blocks of cooling medium 18 are adapted to be inserted. The blocks are preferably of carbon dioxide in order that the gases escaping therefrom may be utilized in dispensing the beverage. The bottom plate 17 is provided with projections 19 which extend downwardly therefrom and into a heat interchange compartment 20 formed by downwardly extending walls 21 which space the plate 17 from the bottom 11. Ducts 22 serve as a means for affording communication between the heat interchange chamber 20 and compartment 23 which lies above the top plate 16 and within the container 10.

The housing 10 is adapted to receive a container 24 which may contain a beverage, such as beer, and is preferably formed with a restricted neck 25 which is adapted to fit within the collar 15. A spacing ring 26 may be used to facilitate the seating of the container 24 in the position illustrated in Figure 1 and a bushing 27 is adapted to be threaded within the neck 25 of the container 24.

Upon the bushing 27 a top cap 28 is adapted to be positioned, the under surface of the top cap being formed with an annular rib 29 which may fit within the bushing 27 in order that the cap may be properly centered. An upwardly extending flange 30 is formed on the cap and provided with a recess 31 within which a bale 32 is adapted to engage to secure the cap 28 in position. Bale 32 may be suitably hinged to a ring 33 which may be secured under a flange on the bushing 15.

Secured to the under portion of cap 28 is a U-shaped tubular member formed with arms 34 and 35 and a bight portion 36. Included in the bight portion is a fitting 37 which is formed with a recessed boss 38, serving as a step bearing for a shaft 39 which is rotatably mounted therein. The shaft is centered at its upper end in a recessed fitting 40 and is provided with a contact member 41. The top 28 is recessed at 42 to receive the upper end of shaft 39 and contact member 41 and, at its cylindrical surface, is provided with spaced contacts 43 and 44. The contact 41, when rotated, engages the contact points 43 and 44 and establishes electrical contact therebetween. The contacts are connected in an electrical circuit including wires 45 which pass through a tubular casing 46 and are connected with an electric motor 47 for driving a fan 48. The motor 47 is connected through wires 49 to an electric plug 50 which serves as a source of power for driving the motor 47.

Secured to the fitting 37 is a coiled thermostatic element 51, the element receiving therein the shaft 39 and being secured to the said shaft at its other end 52. As the temperature of the contents of container 24 vary, the shaft 39 is rotated and when the temperature rises to a predetermined value, the electric motor is operated to circulate air through the conduits 22 and between the compartment 23 and the heat interchange chamber 20. The temperature of the beverage is thus decreased to a minimum temperature at which time the circuit of motor 47 is broken and the circulation of air ceases.

In order that the pressure of the gas in the chamber between plates 16 and 17 may be utilized, a pipe 53 is secured to the housing 10 and communicates with such chamber. The pipe further communicates with a duct 54 which is formed within the bushing 27 and top 28, the duct 54 communicating with a manifold 55 which communicates with the tubular arm 34 of the U-shaped member. The manifold 55 also communicates with a pressure relief or regulating member 56 in order that the pressure within the container may be suitably controlled. The upper portion of tube 34 is formed with an aperture 57 and is plugged at 58, thus introducing the pressure medium within the manifold 55 into the upper portion of the interior of container 24. The pressure present in the manifold 55 is thus impressed upon the surface of the liquid within the container 24 and the same is dispensed through an aperture 59 which permits the liquid to flow into the hollow tubular arm 35 and through a duct 60, formed in cap 28, to a discharge pipe 61. A faucet or other regulating mechanism 62 is provided in order that the flow of the beverage may be suitably controlled.

To facilitate the transportation and replacement of filled containers 24 for the empty ones, plugs 63 may be provided, these plugs preferably fitting within the upper portion of the containers. The foregoing container structure will be seen to include a unitary device within which a beverage may be maintained under predetermined temperature and pressure conditions, the temperature and pressure medium serving also as a carbonating medium.

A simplified form of the invention is illustrated in Fig. 4, wherein a housing 64 is provided with a faucet 65 adjacent the lower extremity thereof, in order that a beverage introduced into the interior of housing 64 may be dispensed. A horizontal partition 66 is provided within the housing 64 and forms an upper compartment which is sub-divided by means of a vertical partition 67. At one side of the vertical partition 67 a suitable refrigerating medium 68 is inserted, the gas generated thereby flowing into the compartment upon the other side of partition 67. From this compartment the pressure is applied to the surface of the medium within the lower portion of the container or housing 64 through an aperture 69. A lid 70 is provided for the container and a suitable pressure regulating device 71 is provided within the partition 67 in order that the pressure upon the beverage may be regulated.

From the foregoing, it will be seen that a container has been provided for effectively utilizing the temperature and pressure producing means as a means for dispensing the beverage as well as carbonating the same. The structure of the container is such that the entire mechanism is contained therein as a unit and the beverage container inserted and removed with facility.

While the invention has been described with specific reference to the accompanying drawings, it is not to be limited, save as defined in the appended claims.

I claim as my invention:

1. A dispensing device comprising a housing, a container supported by the housing, a compartment on the housing to receive a refrigerant, means to communicate between the container and the compartment, and means to circulate a fluid within the housing and adjacent the container and compartment.

2. A dispensing device comprising a housing, a container supported by the housing, spaced walls adapted to be positioned removably within the housing to receive a refrigerating medium, means to communicate between the container and the compartment, and means to circulate a fluid within the housing and adjacent the container and compartment.

3. A dispensing device comprising a housing, a container supported by the housing, a compartment on the housing to receive a refrigerant, means to communicate between the container and the compartment, a removable wall spaced beneath the last named walls to form a heat interchange compartment, ducts between the last named compartment and the region in the housing above the refrigerant compartment, and means to communicate between the refrigerant compartment and the container.

4. A dispensing device comprising a housing, a container supported in the housing, spaced walls in the housing beneath the container and adapted to be positioned removably therein to receive a refrigerating medium, means to communicate between the container and the compartment, a removable wall spaced beneath the last named walls to form a heat interchange compartment, ducts between the last named compartment and the region in the housing above the refrigerant compartment, and means to communicate between the refrigerant compartment and the container.

5. A dispensing device comprising a housing, a container supported in the housing, spaced walls in the housing beneath the container and adapted to be positioned removably therein to receive a refrigerating medium, means to communicate between the container and the compartment, a removable wall spaced beneath the last named walls to form a heat interchange compartment, ducts between the last named compartment and the region in the housing above the refrigerant compartment, temperature controlled means in the housing to circulate a fluid through the ducts, and means to communicate between the refrigerant compartment and the container.

6. A container having an opening, a fitting adapted to be mounted on the opening, a U-shaped tubular member on the fitting and adapted to extend downwardly into the container, means to connect one end of the tubular member to a source of pressure, means to connect the other end of the tubular member with an outlet, an aperture in the member adjacent the lower extremity thereof, and an obstruction in the member between the aperture and the first connection.

7. A container having an opening, a fitting adapted to be mounted on the opening, a U-shaped tubular member on the fitting and adapted to extend downwardly into the container, means to connect one end of the tubular member to a source of pressure, means to connect the other end of the tubular member with an outlet, an aperture in the member adjacent the lower extremity thereof, an obstruction in the member between the aperture and the first connection, a shaft journaled in the fitting and in the lower extremity of the member, and a thermostat connected to the shaft to rotate the same.

8. A container having an opening, a fitting adapted to be mounted on the opening, a U-shaped tubular member on the fitting and adapted to extend downwardly into the container, means to connect one end of the tubular member to a source of pressure, means to connect the other end of the tubular member with an outlet, an aperture in the member adjacent the lower extremity thereof, an obstruction in the member between the aperture and the first connection, a shaft journaled in the fitting and in the lower extremity of the member, a thermostat connected to the shaft to rotate the same, and a switch actuated by the shaft.

9. A beverage container having an opening, a fitting adapted to be mounted on the opening, a U-shaped tubular member on the fitting and adapted to extend downwardly into the container, a compartment associated with the container to receive a refrigerant, a conduit to connect the compartment with one end of the tubular member, a fan to circulate a fluid between the exterior of the compartment and the container, means to connect the other end of the tubular member with an outlet, an aperture in the member adjacent the lower extremity thereof, an aperture in the member between the first aperture and the conduit and adjacent the top of the container, an obstruction in the member between the apertures, a shaft journaled in the fitting and the lower extremity of the member, a thermostat connected to the shaft to rotate the same, a switch actuated by the shaft and an electrical circuit controlled by the switch for operating the fan.

ALFRED F. MASURY.